(12) United States Patent
Tomura et al.

(10) Patent No.: US 10,435,583 B2
(45) Date of Patent: Oct. 8, 2019

(54) CURING AGENT FOR EPOXY RESINS, AND EPOXY RESIN COMPOSITION OBTAINED USING SAME

(71) Applicant: DIC Corporation, Tokyo (JP)

(72) Inventors: Tsugio Tomura, Ichihara (JP); Hiroshi Moriyama, Ichihara (JP); Hideaki Kawahara, Ichihara (JP)

(73) Assignee: DIC Corporation, Tokyo (JP)

( * ) Notice: Subject to any disclaimer, the term of this patent is extended or adjusted under 35 U.S.C. 154(b) by 58 days.

(21) Appl. No.: 15/527,874

(22) PCT Filed: Nov. 12, 2015

(86) PCT No.: PCT/JP2015/081841
§ 371 (c)(1),
(2) Date: May 18, 2017

(87) PCT Pub. No.: WO2016/088528
PCT Pub. Date: Jun. 9, 2016

(65) Prior Publication Data
US 2018/0327629 A1    Nov. 15, 2018

(30) Foreign Application Priority Data

Dec. 3, 2014   (JP) ................................. 2014-244893

(51) Int. Cl.
| | | |
|---|---|---|
| *C09D 163/00* | (2006.01) | |
| *C04B 41/63* | (2006.01) | |
| *C04B 41/00* | (2006.01) | |
| *C04B 41/48* | (2006.01) | |
| *C08G 59/50* | (2006.01) | |
| *C08G 59/22* | (2006.01) | |
| *C08G 59/24* | (2006.01) | |
| *C04B 28/02* | (2006.01) | |

(52) U.S. Cl.
CPC .......... *C09D 163/00* (2013.01); *C04B 41/009* (2013.01); *C04B 41/4853* (2013.01); *C04B 41/63* (2013.01); *C08G 59/223* (2013.01); *C08G 59/226* (2013.01); *C08G 59/245* (2013.01); *C08G 59/5026* (2013.01); *C08G 59/5033* (2013.01)

(58) Field of Classification Search
CPC ..... C09D 163/00; C04B 41/63; C04B 41/009; C04B 41/4853; C08G 59/5026; C08G 59/5033; C08G 59/223; C08G 59/226; C08G 59/245
USPC ........................................................ 525/529
See application file for complete search history.

(56) References Cited

U.S. PATENT DOCUMENTS

| | | |
|---|---|---|
| 6,316,529 B1 | 11/2001 | Temme et al. |
| 9,039,951 B2 | 5/2015 | Meegan |
| 2015/0094400 A1* | 4/2015 | Zheng .................... C08G 59/60 523/222 |
| 2015/0218345 A1 | 8/2015 | Meegan |

FOREIGN PATENT DOCUMENTS

| | | |
|---|---|---|
| JP | 47-034840 A | 11/1972 |
| JP | 04-275383 A | 9/1992 |
| JP | 05-070564 A | 3/1993 |
| JP | 07-216057 A | 8/1995 |
| JP | 2002-504951 A | 2/2002 |
| JP | 2005-187683 A | 7/2005 |
| JP | 2007-284467 A | 11/2007 |
| WO | 2013/130378 A1 | 9/2013 |

OTHER PUBLICATIONS

International Search Report dated Feb. 16, 2016, issued for PCT/JP2015/081841.

* cited by examiner

*Primary Examiner* — David T Karst
(74) *Attorney, Agent, or Firm* — Locke Lord LLP

(57) ABSTRACT

Provided are a curing agent for epoxy resins, which is a curing agent capable of curing an epoxy resin at room temperature, and which can form a cured product (cured coating film) having excellent adhesion even to a substrate which is not in an environment completely dried, and an epoxy resin composition obtained using the same. A curing agent for epoxy resins, containing (a1) an aromatic amine, (a2) an aliphatic amine having an aromatic ring or a cycloalkane ring, and (a3) a curing accelerator, and an epoxy resin composition containing the curing agent and an epoxy resin.

13 Claims, No Drawings

CURING AGENT FOR EPOXY RESINS, AND EPOXY RESIN COMPOSITION OBTAINED USING SAME

TECHNICAL FIELD

The present invention relates to an epoxy resin composition that can form a coating film having excellent adhesion even to a surface to be coated, which is not completely dried, and more particularly to a curing agent for epoxy resins, which enables a liquid epoxy resin to be cured at room temperature, and which enables application to a wet surface, and an epoxy resin composition obtained using the same.

BACKGROUND ART

Conventionally, a number of steel structures and concrete structures have been built at the sea, beach, river, lake, and the like, and they are always exposed to a severe corrosive environment. As a conventional technique for repairing the wet surfaces of these structures, one which is conducted by intercepting water at the surroundings and discharging the water and drying the surfaces is known, but this technique needs a very high cost of the operations.

Therefore, there have been provided corrosion-resistant materials of a wet surface coating type, which can be applied and cured without completely drying the surface, and which have a polyamide curing epoxy resin, a modified amine curing epoxy resin, an unsaturated polyester resin, or the like as a base material (see, for example, PTL's 1 and 2).

However, the coating materials of a wet surface coating type having the above-mentioned resin as a base material have problems in that the application properties with respect to the wet surface of concrete are insufficient, and in that, even when the composition can be applied to the wet surface of concrete, the formed film has only insufficient adhesion to the surface.

In recent years, from the viewpoint of the life of large-size structures, demands of repairing the concrete having cracks and making the concrete aseismatic are increasing, and however, particularly with respect to the difficult application such as in tunnels having spring water and hot spring places which are highly acidic, a conventionally provided coating material of a wet surface coating type frequently cannot meet the demands, and an improvement of the performance of the coating material is desired.

CITATION LIST

Patent Literature

PTL 1: JP-A-7-216057
PTL 2: JP-A-2005-187683

SUMMARY OF INVENTION

Technical Problem

In view of the above problems, an object to be achieved by the present invention is to provide a curing agent for epoxy resins, which is a curing agent capable of curing an epoxy resin at room temperature, and which can form a cured product (cured coating film) having excellent adhesion even to a substrate which is not in an environment completely dried, and an epoxy resin composition obtained using the same.

Solution to Problem

The present inventors have conducted extensive and intensive studies with a view toward solving the above-mentioned problems. As a result, it has been found that the problems can be solved by using an aromatic amine and a specific aliphatic amine in combination, thereby completing the present invention.

Specifically, the present invention provides a curing agent for epoxy resins, which is characterized by containing (a1) an aromatic amine, (a2) an aliphatic amine having an aromatic ring or a cycloalkane ring, and (a3) a curing accelerator, and an epoxy resin composition containing a combination of the curing agent and an epoxy resin.

Advantageous Effects of Invention

According to the present invention, there can be provided an epoxy resin curing system which can form a cured product having excellent adhesion to concrete in the difficult application such as in tunnels having spring water and hot spring places which are highly acidic, which a conventional coating material of a wet surface coating type is insufficient to deal with, and which accordingly, can be advantageously used as a primer for concrete or a repair material, an injection material, or a jointing material for concrete in a wet environment.

DESCRIPTION OF EMBODIMENTS

The curing agent for epoxy resins of the present invention is characterized in that both (a1) an aromatic amine and (a2) an aliphatic amine having an aromatic ring or a cycloalkane ring are used in combination.

Generally, it is known that the aromatic amine (a1) has poor curing properties at room temperature even when used in combination with a liquid epoxy resin and a curing accelerator, thereby making it difficult to obtain a coating film dried in terms of finger touching. Meanwhile, the aromatic amine is an aromatic compound, and hence the coating film obtained therefrom is also known to be excellent in water resistance, and therefore the aromatic amine is suitable for application to a wet surface. However, it is impossible to perform a heat curing reaction outdoors, and therefore, when applied to a room temperature curing system, the use of the aromatic amine is limited to that in an amount as small as a level of an additive.

On the other hand, the aliphatic amine can be reacted with an epoxy resin at room temperature, and therefore has been widely used as a material for general coating materials. However, the short-chain aliphatic amine is water-soluble, and even the long-chain amine is likely to form a cured coating film having an insufficient water resistance, thereby causing the coating film to suffer whitening in a wet environment in many cases.

In the present invention, extensive and intensive studies have been conducted with a view toward effectively using advantageous features of both the aromatic amine and the aliphatic amine to enable the application to a wet surface. As a result, it has been found that, by using an aliphatic amine (a2) having an aromatic ring or a cycloalkane ring as an aliphatic amine, when used in combination with an epoxy resin, the resultant cured product has excellent water resistance, excellent adhesion, and the like.

With respect to the aromatic amine (a1) usable in the present invention, there is no particular limitation, but examples thereof include phenylenediamine, diaminodiphenylmethane, diaminodiphenyl ether, diaminodiphenyl sulfone, 1,3-bis(3-aminophenoxy)benzene, diethyltoluenediamine, ortho-toluenediamine, meta-toluenediamine, a methylene-cross linked poly(phenylene)amine mixture (for example, a condensation product derived from aniline and formaldehyde), a mixture of 2,2'-/2,4'-/4,4'-diaminodiphenylmethane isomers, those similar thereto, and combinations thereof, and these may be used individually or two or more types thereof may be used in an appropriate combination.

Examples of the aromatic amine (a1) includes those which are in a solid state or highly crystalline at room temperature (10 to 30° C.) and therefore are unlikely to be liquefied. Such aromatic amines are preferably used in a liquefied form as a generally called an epoxy adduct, which is formed by performing partial modification with the liquid epoxy resin (B) described later. The epoxy adduct suffers ring-opening of an epoxy group to form a hydroxyl group, and the hydroxyl group has an effect to accelerate a reaction of a glycidyl group and an amino group and further contributes to adhesion to a substrate, thus achieving excellent room temperature curing properties, excellent adhesion, and the like.

Of these, particularly, from the viewpoint of obtaining a cured product having excellent adhesion to a concrete substrate and facilitating preparation of a liquid curing agent having fluidity at room temperature, an epoxy adduct of diaminodiphenylmethane or an epoxy adduct of diethyltoluenediamine is preferably used.

It is essential that the aliphatic amine (a2) used in the present invention have an aromatic ring or a cycloalkane ring in the structure thereof. By virtue of having such a cyclic structure, the resultant cured product has excellent water resistance and therefore suffers no whitening even in a wet environment.

With respect to the aliphatic amine (a2), there is no particular limitation, but examples thereof include 1,2-diaminocyclohexane, 1,3-diaminocyclohexane, 1,4-diaminocyclohexane, hydrogenated ortho-toluenediamine, hydrogenated meta-toluenediamine, metaxylylenediamine, hydrogenated metaxylylenediamine, isophorone diamine, various isomers or norbornanediamine, benzylamine, benzylethylenediamine, 3,3'-dimethyl-4,4'-diaminodicyclohexylmethane, 4,4'-diaminodicyclohexylmethane, 2,4'-diaminodicyclohexylmethane, and methylene-crosslinked poly(cyclohexyl)amine, and these may be used individually or two or more thereof may be used in combination. These amines may be subjected to a certain type of modification, such as Mannich modification, epoxy adduct, or polyamideamine, before being used for the purpose of adjusting the molecular weight to suppress the volatility or adjusting the fluidity of the curing agent to be in such a range that the curing agent can be easily handled.

Of these, from the viewpoint of achieving excellent curing properties in a wet environment when used in combination with an epoxy resin and obtaining a cured product having excellent adhesion to a substrate, benzylethylenediamine, benzylamine, or metaxylenediamine is preferably used.

The curing agent in the present invention contains a curing accelerator (a3) in addition to the above-mentioned aromatic amine (a1) and specific aliphatic amine (a2). The curing accelerator (a3) accelerates a reaction of a glycidyl group in an epoxy resin and an amino group as can be seen from its name, and examples of the curing accelerator include various aromatic carboxylic acids, amines other than the above-mentioned (a1) and (a2), phenols and modification products thereof.

Examples of the aromatic carboxylic acid include benzoic acid, salicylic acid, trihydroxybenzoic acid, phthalic acid, cinnamic acid, and benzenehexacarboxylic acid.

Examples of the amine include tertiary amines, such as bis(dimethylaminomethyl)phenol, benzyldimethylamine (BDMA), 2(dimethylaminomethyl)phenol (DMP-10), 2,4,6-(trisdimethylaminomethyl)phenol (DMP-30), and 1,8-diazabiscyclo(5,4,0)undecene-1 (DBU); hydroxylamines, such as hydroxylamine and phenoxyamine; and imidazoles, such as imidazole, 1-methylimidazole, 2-methylimidazole, 4(5)-methylimidazole, 2-ethyl-4methylimidazole, 2-ethylimidazole, and 2-phenylimidazole.

Examples of the phenol include phenol, cresol, butylphenol, 4-tertiary-butylphenol, 4-secondary-butylphenol, 2-tertiary-butylphenol, 2-secondary-butylphenol, 4-octylphenol, 4-tertiary-butylcatechol, nonylphenol, dodecylphenol, and cardanol.

Further, with respect to the modification product of phenol, a Mannich reaction product, a phenlic resin, or the like may be used as the curing accelerator (a3).

Of these, from the viewpoint of facilitating control of the room temperature curing rate when used in combination with an epoxy resin, a phenol or an imidazole is preferably used, and, particularly, 4-tertiary-butylphenol or 2-methylimidazole is preferably used. Further, a method of using both of them in combination is preferred.

In the curing agent of the present invention, with respect to the ratio of the aromatic amine (a1) and specific aliphatic amine (a2) used, there is no particular limitation. However, from the viewpoint of the curing properties at room temperature when used in combination with an epoxy resin and the water resistance and adhesion of the obtained cured product, the mass ratio (a1)/(a2) of the aromatic amine (a1) to the aliphatic amine (a2) is preferably in the range of from 10/90 to 90/10, especially preferably in the range of from 50/50 to 80/20.

The amount of the curing accelerator (a3) used in the curing agent of the present invention is preferably in the range of from 10 to 40% by mass, based on the total mass of the curing agent. As mentioned above, a phenol or an imidazole is preferably used, and, when a phenol and an imidazole are used in combination, with respect to the ratio of the phenol and imidazole used, the phenol/imidazole (mass ratio) is preferably in the range of from 80/20 to 100/0.

According to the curing agent of the present invention, the use of the aromatic amine (a1) and the aliphatic amine (a2) in combination may cause insufficient uniformity. In such a case, it is preferred to use a xylene resin or the like having compatibility with both the aromatic amine and the aliphatic amine in combination. In this case, the amount of the xylene resin used is preferably in the range of from 5 to 30% by mass based on the total mass of the curing agent, from the viewpoint of preventing inhibition of the room temperature curing properties and achieving excellent adhesion, strength or the like of the cured product.

Therefore, with respect to the formulation of the curing agent of the present invention, when the total amount of the curing agent is 100 parts by mass, it is preferred that the amount of the aromatic amine (a1) is 50 to 60 parts by mass, the amount of the specific aliphatic amine (a2) is 20 to 30 parts by mass, the amount of the phenol curing accelerator is 5 to 15 parts by mass, the amount of the imidazole curing accelerator is 0 to 5 parts by mass, and the amount of the xylene resin is 5 to 15 parts by mass.

In the curing agent of the present invention, in addition to the above-mentioned components, various types of an additive or a filler or the like maybe incorporated as long as the effects of the present invention are not inhibited. Examples of the additives and fillers include additives, such as a surfactant, a chelating agent, and an amine salt of polycarboxylic acid, various anti-foaming agents, rust proof pigments, such as chromate, phosphate, molybdic acid, boric acid, plumbic acid, ferrite, and meal powder pigments, flaky pigments, reinforcing fibers, coloring pigments generally used in a coating material, loading pigments, such as ultrafine powder silica, calcium carbonate, surface-treated calcium carbonate, talc, mica, and aluminum silicate, cement, activated alumina, calcium carbonate, and titanium oxide.

The curing agent of the present invention functions as a curing agent for various epoxy resins, and the epoxy resin can be appropriately selected according to the use and the physical properties of the cured product. However, in view of excellent curing properties of the curing agent in a wet environment, the curing agent is preferably used in the form of a two-part composition in combination with the liquid epoxy resin (B).

With respect to the liquid epoxy resin (B), there is no particular limitation as long as it reacts with an amino group in the curing agent of the present invention. However, from the viewpoint of the fluidity and curing reaction rate of the prepared composition, the adhesion of the cured product to a substrate, the water resistance of the cured product and the like, a bisphenol epoxy resin (b1) is preferably used, and, particularly, a bisphenol A epoxy resin or a bisphenol F epoxy resin is most preferably used.

With respect to the liquid epoxy resin (B), from the viewpoint of the fluidity of the composition and the mechanical physical properties of the cured product, it is preferred that (b2) a polyhydric alcohol glycidyl ether, (b3) an aliphatic carboxylic acid glycidyl ester are used in combination with the bisphenol epoxy resin (b1). Examples of the polyhydric alcohol glycidyl ether include polyethylene glycol diglycidyl ether, polypropylene glycol diglycidyl ether, butanediol diglycidyl ether, neopentyl glycol diglycidyl ether, 1,6-hexanediol diglycidyl ether, ethylene propylene glycol diglycidyl ether, polypropylene glycol diglycidyl ether, diglycidylaniline, resolcinol diglycidyl ether, hydrogenated bisphenol A diglycidyl ether, trimethylolpropane triglycidyl ether, and glycerol triglycidyl ether, and these may be used individually or two or more thereof may be used in combination. Examples of the aliphatic carboxylic acid glycidyl ester (b3) include glycidyl neodecanoate.

Of these, from the viewpoint of excellent compatibility with the above-mentioned curing agent, the fluidity and the curing rate of the prepared composition, the mechanical strength of the obtained cured product, and the like, 1,6-hexanediol diglycidyl ether or glycidyl neodecanoate is preferably used.

With respect to the ratio between the bisphenol epoxy resin (b1) and polyhydric alcohol glycidyl ether (b2) and/or polybasic acid glycidyl ester (b3) to be used, there is no particular limitation, but the mass ratio of the (b1) to the [(b2)+(b3)], i.e., (b1)/[(b2)+(b3)] is preferably in the range of from 70/30 to 90/10 from the viewpoint of excellent balance between the reaction rate, the strength of the cured product, and the adhesion to a substrate.

Further, it is preferred that the epoxy equivalent of the epoxy resin (B) is adjusted to be in the range of from 150 to 250 since the incorporation into the curing agent (A) of the present invention is easy, and the ratio of the theoretical active hydrogen equivalent (calculated value) in the curing agent (A) and the epoxy equivalent of the epoxy resin (B) used is preferably in the range of from 1.0/0.7 to 1.0/1.2.

In the epoxy resin composition of the present invention, it is preferred that a reactive functional group-containing silane coupling agent (c) is used from the viewpoint of further improving the adhesion to a substrate to facilitate the application in a wet environment.

With respect to the silane coupling agent (c), there is no particular limitation, and examples thereof include vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, N-(vinylbenzyl)-2-aminoethyl-3-aminopropyltrimethoxysilane hydrochloride, special aminosilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl) tetrasulfide, 3-isocyanate propyltriethoxysilane, allyltrichlorosilane, allyltriethoxysilane, allyltrimethoxysilane, diethoxymethylvinylsilane, trichlorovinylsilane, vinyltris(2-methoxyethoxy)silane, diethoxy(glycidyloxypropyl)methylsilane, 3-glycidoxypropylmethyldiethoxysilane, 3-glycidoxypropyltriethoxysilane, 3-mercaptopropyltrimethoxysilane, and bis(triethoxysilylpropyl)tetrasulfide. These silane coupling agents maybe used individually or two or more thereof may be used in combination.

Of these, a functional group-containing silane coupling agent having reactivity with the curing agent (A) or epoxy resin (B) is preferably used. It is especially preferred that the functional group-containing silane coupling agent is appropriately selected and used as long as the storage stability is not inhibited, and, for example, when an amino group-containing silane coupling agent is used, it is added to the curing agent (A) of the present invention in advance, or, when a glycidyl group-containing silane coupling agent is used, it is added to the liquid epoxy resin (B) in advance.

With respect to the preferred amount of the incorporated silane coupling agent (c) which is used as one component of the composition, for example, the silane coupling agent is used in an amount in the range of from 1 to 10% by mass, especially preferably in the range of from 1 to 5% by mass, based on the mass of the composition. Particularly, when a glycidyl group-containing silane coupling agent is used, the silane coupling agent is preferably used in an amount in the range of from 1 to 10% by mass based on the mass of the liquid epoxy resin (B).

The resin composition of the present invention may further contain an additive, such as an ultraviolet light absorber, an antioxidant, a silicon additive, organic beads, a fluorine additive, a rheology controlling agent, a defoaming agent, an anti-fogging agent, a coloring agent, or an inorganic filler.

Examples of the ultraviolet light absorber include triazine derivatives, such as 2-[4-{(2-hydroxy-3-dodecyloxypropyl)oxy}-2-hydroxyphenyl]-4,6-bis (2,4-dimethylphenyl)-1,3,5-triazine and 2-[4-{(2-hydroxy-3-tridecyloxypropyl)oxy}-2-hydroxyphenyl]-4,6-bis (2,4-dimethylphenyl)-1,3,5-triazine, 2-(2'-xanthenecarboxy-5'-methylphenyl)

benzotriazole, 2-(2'-o-nitrobenzyloxy-5'-methylphenyl) benzotriazole, 2-xanthenecarboxy-4-dodecyloxybenzophenone, and 2-o-nitrobenzyloxy-4-dodecyloxybenzophenone.

Examples of the antioxidant include hindered phenol antioxidants, hindered amine antioxidants, organosulfur antioxidants, and phosphate antioxidants. These may be used individually or two or more thereof may be used in combination.

Examples of the silicon additive include polyorganosiloxane having an alkyl group or a phenyl group, polydimethylsiloxane having a polyether-modified acryl group, and polydimethylsiloxane having a polyester-modified acryl group, such as dimethylpolysiloxane, methylphenylpolysiloxane, cyclic dimethylpolysiloxane, methylhydrogenpolysiloxane, a polyether-modified dimethylpolysiloxane copolymer, a polyester-modified dimethylpolysiloxane copolymer, a fluorine-modified dimethylpolysiloxane copolymer, and an amino-modified dimethylpolysiloxane copolymer. These may be used individually or two or more thereof may be used in combination.

Examples of the organic beads include polymethyl methacrylate beads, polycarbonate beads, polystyrene beads, polyacryl-styrene beads, silicone beads, glass beads, acryl beads, benzoguanamine resin beads, melamine resin beads, polyolefin resin beads, polyester resin beads, polyamide resin beads, polyimide resin beads, polyethylene fluoride resin beads, and polyethylene resin beads. These may be used individually or two or more thereof may be used in combination.

As examples of the fluorine additive, there can be mentioned "MEGAFACE" series, manufactured by DIC Corporation. These may be used individually or two or more thereof may be used in combination.

The amounts of the above-mentioned various additives used are preferably in such a range that the additives sufficiently exhibit their effects and further the effects of the present invention are not inhibited. Specifically, each additive is preferably used in an amount in the range of from 0.01 to 40 parts by mass, relative to 100 parts by mass of the epoxy resin composition.

When the epoxy resin composition of the present invention is composed of two parts of the curing agent (A) of the present invention and the liquid epoxy resin (B), the viscosity of each of the parts used is controlled to be in a desired range. In the liquid epoxy resin (B), by the polyhydric alcohol glycidyl ether (b2) and aliphatic carboxylic acid glycidyl ester (b3) used in combination, the viscosity is controlled to be preferably in the range of from 20 to 3,000 mPa·s, further preferably in the range of from 50 to 1,500 mPa·s. When the viscosity is in the above range, the application properties and penetrating properties to the ground in a dry and wet state are more excellent, and further the curing properties at low temperatures are more excellent. With respect to the method for preparing the composition, there is no particular limitation, and the both components may be mixed with each other so as to be uniform.

When the epoxy resin composition of the present invention is applied to, for example, the surface of concrete, the composition penetrates very small pores present in the concrete, and further exhibits excellent effect of discharging moisture, and hence penetrates the surface of the ground and the inside of the ground while discharging moisture, so that the composition can be strongly bonded to the ground. Therefore, with respect to a ground, such as the surface of concrete, to which the epoxy resin composition of the present invention is applied, there is no need to remove rust, deposits, or the like from the ground in advance, and the surface of the ground need not be smooth.

When the epoxy resin composition of the present invention is cured in an outdoor environment, there is no need to control the moisture in the environment, and the temperature is preferably in the range of from 10 to 30° C., and the period of time until the composition is dried in terms of finger touching is generally 16 to 40 hours.

The curing properties of the epoxy resin composition of the present invention are not affected by water and are not inhibited by water, and therefore the epoxy resin composition can form a primer layer which is cured and strongly bonded to the ground in a wet state. A resin coating film layer to be applied onto the primer layer can be formed using various resins having film-forming properties.

Examples include coating film waterproofing materials, such as urethane rubbers, acrylic rubbers, chloroprene rubbers, acrylic resins, acrylic resins, rubber asphalts, and fiber-reinforced resins, and epoxy resins, polyurethane resins, polyurea resins, polyester resins, vinyl ester resins, and acrylic resins. Further, resin (polymer) mortar, resin (polymer) concrete and the like using the above resins can be used as a coating film material to be formed on the primer.

Further, the epoxy resin composition of the present invention can be advantageously used as a repair material for crack portions in the surface of concrete or an injection material, and further can be used as a jointing material.

EXAMPLES

Hereinbelow, the present invention will be described in more detail with reference to the following specific Production Examples and Examples, which should not be construed as limiting the scope of the present invention. In the following Examples, the "part(s)" and "%" are given by mass unless otherwise specified.

<Preparation of a main body containing an epoxy resin>

Synthesis Example 1

Into a four-neck glass flask equipped with a temperature controller, a temperature sensor, a stirrer, a condenser, and a nitrogen line, 800 g of a bisphenol A epoxy resin (EPICLON 850, manufactured by DIC Corporation; epoxy equivalent: 188), 170 g of 1,6-hexanediol diglycidyl ether (SR-16HS, manufactured by Sakamoto Yakuhin Kogyo Co., Ltd.; epoxy equivalent: 155), and 30 g of 3-glycidoxypropyltrimethoxysilane (KBM-403, manufactured by Shin-Etsu Chemical Co., Ltd.; epoxy equivalent: 236) were added, and the resultant mixture was stirred and mixed, and maintained at 80° C. for one hour. Uniform dissolution was confirmed, and thus a main body containing an epoxy resin and having an epoxy equivalent of 183 was obtained.

Synthesis Example 2

Preparation was conducted in the same manner as in Synthesis Example 1 except that a bisphenol F epoxy resin (EPICLON 830, manufactured by DIC Corporation; epoxy equivalent: 172) was used instead of the bisphenol A epoxy resin, thereby obtaining a main body containing an epoxy resin and having an epoxy equivalent of 170.

Example 1

550 g of 4,4'-diaminodiphenylmethane (ISOCLO-SSMDA, manufactured by SHUANG-BANG INDUS- TRIAL CORP.; active hydrogen equivalent: 49.6; melting point: 90° C.) was added into a four-neck glass flask equipped with a temperature controller, a temperature sensor, a stirrer, a condenser, and a nitrogen line, and heated to 100° C. so as to be sufficiently dissolved. After dissolution of the 4,4'-diaminodiphenylmethane was confirmed, it was maintained at the same temperature for 30 minutes. Then, 250 g of benzylethylenediamine (Hardener OH-802, manufactured by PTI Japan Corporation; active hydrogen equivalent: 50) was added thereto and the resultant mixture was maintained for 30 minutes. The mixture was cooled to 80° C., and 100 g of 4-tertiary-butylphenol (DIC-PTBP, manufactured by DIC Corporation) was added to the mixture and sufficiently dissolved at 80° C. After dissolution of the 4-tertiary-butylphenol was confirmed, the resultant mixture was maintained at the same temperature for 30 minutes. The mixture was cooled to 60° C., and 100 gg of a xylene resin (NIKANOL Y-50, manufactured by Fudow Co., Ltd.) was added to the mixture and dissolved at 60° C. After dissolution of the xylene resin was confirmed, the resultant mixture was maintained at the same temperature for 30 minutes, obtaining a curing agent having an active hydrogen equivalent of 62.

Example 2

Into a four-neck glass flask equipped with a temperature controller, a temperature sensor, a stirrer, a condenser, and a nitrogen line, 550 g of diethyltoluenediamine (DETDA-80, manufactured by Lonza Japan; active hydrogen equivalent: 58) and 250 g of benzylethylenediamine (Hardener OH-802, manufactured by PTI Japan Corporation; active hydrogen equivalent: 50) were added, and the resultant mixture was stirred and the temperature was elevated to 80° C. and maintained for 30 minutes. The mixture was cooled to 80° C., and 100 g of 4-tertiary-butylphenol (DIC-PTBP, manufactured by DIC Corporation) was added to the mixture and sufficiently dissolved at 80° C. After dissolution of the 4-tertiary-butylphenol was confirmed, the resultant mixture was maintained at the same temperature for 30 minutes. The mixture was cooled to 60° C., and 100 g of a xylene resin (NIKANOL Y-50, manufactured by Fudow Co., Ltd.) was added to the mixture and dissolved at 60° C. After dissolution of the xylene resin was confirmed, the resultant mixture was maintained at the same temperature for 30 minutes, thereby obtaining a curing agent having an active hydrogen equivalent of 58.

Example 3

Production was conducted in the same manner as in Example 1 except that benzylamine (benzylamine, manufactured by Koei Chemical Co., Ltd.; active hydrogen equivalent: 53.5) was used instead of benzylethylenediamine, thereby obtaining a curing agent having an active hydrogen equivalent of 63.

Example 4

Production was conducted in the same manner as in Example 2 except that benzylamine (benzylamine, manufactured by Koei Chemical Co., Ltd.; active hydrogen equivalent: 53.5) was used instead of benzylethylenediamine, thereby obtaining a curing agent having an active hydrogen equivalent of 59.

Example 5

400 g of 4,4-diaminodiphenylmethane (ISOCLOSSMDA, manufactured by SHUANG-BANG INDUSTRIAL CORP.; active hydrogen equivalent: 49.6; melting point: 90° C.) was added into a four-neck glass flask equipped with a temperature controller, a temperature sensor, a stirrer, a condenser, and a nitrogen line, and heated to 100° C. so as to be sufficiently dissolved. After dissolution of the 4,4'-diaminodiphenylmethane was confirmed, 150 g of a bisphenol A epoxy resin (EPICLON 850, manufactured by DIC Corporation; epoxy equivalent: 188) was slowly added thereto and dissolved therein while taking care of heat generation. The temperature of the resultant mixture was elevated to 110° C. and the mixture was maintained at the same temperature for one hour. Then, the temperature of the mixture was elevated to 180° C. over one hour. The mixture was maintained at the same temperature for two hours to perform a reaction. The resultant reaction mixture was cooled to a temperature of 120° C., and 250 g of benzylethylenediamine (Hardener OH-802, manufactured by PTI Japan Corporation; active hydrogen equivalent: 50) was added to the mixture and maintained for 30 minutes. The mixture was cooled to 80° C., and 100 g of 4-tertiary-butylphenol (DIC-PTBP, manufactured by DIC Corporation) was added to the mixture and sufficiently dissolved at 80° C. After dissolution of the 4-tertiary-butylphenol was confirmed, the resultant mixture was maintained at the same temperature for 30 minutes. Then, 100 g of a xylene resin (NIKANOL Y-50, manufactured by Fudow Co., Ltd.) was added to the mixture and dissolved at 80° C. After dissolution of the xylene resin was confirmed, the resultant mixture was maintained at the same temperature for 30 minutes, obtaining a curing agent having an active hydrogen equivalent of 82.

Example 6

350 g of a phenolic Mannich reaction product (LUCKAMIDE F4, manufactured by DIC Corporation; active hydrogen equivalent: 80) was added into a four-neck glass flask equipped with a temperature controller, a temperature sensor, a stirrer, a condenser, and a nitrogen line, and heated to 80° C. so as to be sufficiently dissolved. Then, 125 g of a xylene resin (NIKANOL LLL, manufactured by Fudow Co., Ltd.) was added thereto and the resultant mixture was maintained at the same temperature for 30 minutes. Then, 250 g of a metaxylenediamine modification product (GASKAMINE 240, manufactured by Mitsubishi Gas Chemical Company, Inc.; active hydrogen equivalent: 103), 125 g of benzylamine (benzylamine, manufactured by Koei Chemical Co., Ltd.; active hydrogen equivalent: 53.5), and 150 g of diethyltoluenediamine (DETDA-80, manufactured by Lonza Japan; active hydrogen equivalent: 58) were added thereto, and the resultant mixture was maintained at the same temperature for 30 minutes, obtaining a curing agent having an active hydrogen equivalent of 80.

Example 7

300 g of a phenolic Mannich reaction product (LUCKAMIDE F4, manufactured by DIC Corporation; active hydrogen equivalent: 80) was added into a four-neck glass flask equipped with a temperature controller, a temperature sensor, a stirrer, a condenser, and a nitrogen line, and heated to 80° C. so as to be sufficiently dissolved. Then, 50 g of a xylene resin (NIKANOL LLL, manufactured by Fudow Co., Ltd.) was added thereto and the resultant mixture was maintained at the same temperature for 30 minutes. Then, 250 g of a metaxylenediamine modification product (GASKAMINE 240, manufactured by Mitsubishi Gas Chemical Company, Inc.; active hydrogen equivalent: 103), 150 g of benzylamine (benzylamine, manufactured by Koei Chemical Co., Ltd.; active hydrogen equivalent: 53.5), and 150 g of diethyltoluenediamine (DETDA-80, manufactured by Lonza Japan; active hydrogen equivalent: 58) were added thereto and the resultant mixture was maintained at the same temperature for 30 minutes. Then, 100 g of salicylic acid (manufactured by Rhodia Japan Co., Ltd.) was added thereto, and the resultant mixture was maintained at the same temperature for 60 minutes, obtaining a curing agent having an active hydrogen equivalent of 80.

Comparative Example 1

Production was conducted in the same manner as in Example 2 except that triethylenetetramine (TETA, manufactured by Tosoh Corp.; active hydrogen equivalent: 24.3) was used instead of diethyltoluenediamine, thereby obtaining a curing agent having an active hydrogen equivalent of 36.

Comparative Example 2

Production was conducted in the same manner as in Example 1 except that tetraethylenepentamine (TEPA, manufactured by Tosoh Corp.; active hydrogen equivalent: 27.1) was used instead of diethyltoluenediamine, thereby obtaining a curing agent having an active hydrogen equivalent of 40.

Comparative Example 3

Production was conducted in the same manner as in Example 2 except that triethylenetetramine (TETA, manufactured by Tosoh Corp.; active hydrogen equivalent: 24.3) was used instead of diethyltoluenediamine, and benzylamine (benzylamine, manufactured by Koei Chemical Co., Ltd.; active hydrogen equivalent: 53.5) was used instead of benzylethylenediamine, thereby obtaining a curing agent having an active hydrogen equivalent of 37.

Comparative Example 4

Production was conducted in the same manner as in Example 2 except that tetraethylenepentamine (TEPA, manufactured by Tosoh Corp.; active hydrogen equivalent: 27,1) was used instead of diethyltoluenediamine and benzylamine (benzylamine, manufactured by Koei Chemical Co., Ltd.; active hydrogen equivalent: 53.5) was used instead of benzylethylenediamine, thereby obtaining a curing agent having an active hydrogen equivalent of 40.

Comparative Example 5

Production was conducted in the same manner as in Example 1 except that 4-tertiary-butylphenol was not used and the amount of the xylene resin was changed from 100 g to 200 g, thereby obtaining a curing agent having an active hydrogen equivalent of 62.

Comparative Example 6

Production was conducted in the same manner as in Example 1 except that 4-tertiary-butylphenol was not used and the amount of the xylene resin was changed from 100 g to 200 g, thereby obtaining a curing agent having an active hydrogen equivalent of 58.

The main bodies obtained in the Synthesis Examples and the curing agents obtained in the Examples and Comparative Examples were mixed in the ratios shown in Tables 1 and 2.

The ratio of the main body/curing agent incorporated was controlled so that the equivalent ratio became 1.0/0.9. Tables 1 and 2 show the formulation for 100 g of the main body and the formulation for the corresponding curing agent.

Using each of the obtained epoxy resin compositions, the following evaluation was conducted.

<Simple Bond Evaluation>

A JIS mortar (70 mm×70 mm×20 mm) was polished using #240 polishing paper so that the surface of the layer to be aged became smooth, and then immersed in tap water for one hour. The JIS mortar was taken out from the water and gently wiped with a waste cloth. A backer having an adhesive and having a width of 8 mm and a height of 5 mm was bonded to the polished surface of the mortar as a frame. 2 g of a spot of water was placed within the frame, and 3 g of a resin composition (main body-curing agent mixture) was applied onto the water and subjected to aging under a condition having a temperature of 25° C. and a humidity of 50% for 24 hours. The drying property in terms of finger touching and the state of peeling were evaluated by the methods described below.

Drying Property in Terms of Finger Touching:

After aging at a temperature of 25° C. at a humidity of 50% for 24 hours, the resultant coating film was gently pushed directly with a finger, and the state of the film in this instance was evaluated in accordance with the following criteria.

A: The film is dried so that no fingerprints are left on the finger.

B: The film is dried, but fingerprints are left on the film.

C: The film is not dried.

State of Peeling:

Peeling was made at the resin/mortar interface with a metallic spatula (leather skiving). The state of peeling in this instance was evaluated in accordance with the following criteria.

A: Complete material failure occurred and strong bonding was confirmed.

B: Partial material failure was confirmed.

C: Interfacial peeling occurred or curing properties were poor.

<Bonding Strength>

Aging was conducted under the environment conditions (standard, wet, or dry and wet repeated conditions) described in JIS A6024 "Epoxy injection resins for repairing in buildings". After each aging, a bonding strength test was performed under the standard conditions.

TABLE 1

| Example | 7 | 8 | 9 | 10 | 11 | 12 | 13 | 14 |
|---|---|---|---|---|---|---|---|---|
| Main body | Synth. Exp. 1 | Synth. Exp. 2 | Synth. Exp. 1 | Synth. Exp. 1 | Synth. Exp. 1 | Synth. Exp. 1 | Synth. Exp. 1 | Synth. Exp. 1 |
| Bisphenol A epoxy resin | 80 | | 80 | 80 | 80 | 80 | 80 | 80 |
| Bisphenol F epoxy resin | | 80 | | | | | | |

TABLE 1-continued

| Example | 7 | 8 | 9 | 10 | 11 | 12 | 13 | 14 |
|---|---|---|---|---|---|---|---|---|
| 1,6-Hexanediol Diglycidyl ether | 17 | 17 | 17 | 17 | 17 | 17 | 17 | 17 |
| 3-Glycidoxypropyltrimethoxysilane | 3 | 3 | 3 | 3 | 3 | 3 | 3 | 3 |
| Total | 100 | 100 | 100 | 100 | 100 | 100 | 100 | 100 |
| Curing agent | Exp. 1 | Exp. 1 | Exp. 2 | Exp. 3 | Exp. 4 | Exp. 5 | Exp. 6 | Exp. 7 |
| Bisphenol A epoxy resin |  |  |  |  |  | 6 |  |  |
| 4,4Diaminodiphenylmethane | 17 | 17 |  | 17 |  | 16 |  |  |
| Diethyltoluenediamine |  |  | 15 |  | 16 |  | 6 | 6 |
| Benzylethylenediamine | 8 | 8 | 7 |  |  | 10 |  |  |
| Benzylamine |  |  |  | 8 | 7 |  | 5 | 6 |
| Xylene resin (Y-50) | 3 | 3 | 3 | 3 | 3 | 4 |  |  |
| Xylene resin (LLL) |  |  |  |  |  |  | 5 | 2 |
| 4-Tertiary-butylphenol | 3 | 3 | 3 | 3 | 3 | 4 |  |  |
| Salicylic acid |  |  |  |  |  |  |  | 4 |
| Phenolic Mannich reaction product |  |  |  |  |  |  | 14 | 12 |
| Metaxylenediamine modification product |  |  |  |  |  |  | 10 | 10 |
| Total | 31 | 31 | 28 | 31 | 29 | 40 | 40 | 40 |
| Simple bond evaluation |  |  |  |  |  |  |  |  |
| 25° C. 24 h Drying property in terms of finger touching | A | A | A | A | A | A | A | A |
| State of peeling | A Material failure | A Material failure | A Material failure | A Material failure | A Material failure | A Material failure | A Material failure | A Material failure |
| Bonding strength JIS A6024 |  |  |  |  |  |  |  |  |
| Standard | 9.1 | 8.9 | 9.0 | 8.9 | 8.8 | 9.3 | 9.2 | 9.1 |
| Wet | 7.5 | 7.3 | 7.6 | 7.4 | 7.5 | 7.8 | 8.0 | 7.7 |
| Dry and wet repeated | 6.7 | 6.3 | 6.5 | 6.3 | 6.2 | 6.8 | 6.9 | 6.6 |

TABLE 2

| Comparative Example | 7 | 8 | 9 | 10 | 11 | 12 |
|---|---|---|---|---|---|---|
| Main body | Synth. Exp. 1 | Synth. Exp. 1 | Synth. Exp. 1 | Synth. Exp. 1 | Synth. Exp. 1 | Synth. Exp. 1 |
| Bisphenol A epoxy resin | 80 | 80 | 80 | 80 | 80 | 80 |
| 1,6-Hexanediol Diglycidyl ether | 17 | 17 | 17 | 17 | 17 | 17 |
| 3-Glycidoxypropyltrimethoxysilane | 3 | 3 | 3 | 3 | 3 | 3 |
| Total | 100 | 100 | 100 | 100 | 100 | 100 |
| Curing agent | Comp. Exp. 1 | Comp. Exp. 2 | Comp. Exp. 3 | Comp. Exp. 4 | Comp. Exp. 5 | Comp. Exp. 6 |
| 4,4Diaminodiphenylmethane |  |  |  |  | 17 |  |
| Diethyltoluenediamine |  |  |  |  |  | 15 |
| Triethylenetetramine | 10 |  | 10 |  |  |  |
| Tetraethylenepentamine |  | 10 |  | 11 |  |  |
| Benzylethylenediamine | 5 | 5 |  |  | 8 | 7 |
| Benzylamine |  |  | 5 | 5 |  |  |
| Xylene resin | 2 | 2 | 2 | 2 | 6 | 6 |
| 4-Tertiary-butylphenol | 2 | 2 | 2 | 2 |  |  |
| Total | 18 | 19 | 18 | 20 | 31 | 28 |
| Simple bond evaluation |  |  |  |  |  |  |
| 25° C. 24 h Drying property in terms of finger touching | C Opaque | C Opaque | C Opaque | C Opaque | C | C |
| State of peeling | C Interfacial peeling | C Interfacial peeling | C Interfacial peeling | C Interfacial peeling | C Interfacial peeling | C Interfacial peeling |
| Bonding strength JIS A6024 |  |  |  |  |  |  |
| Standard | 3.8 | 4.0 | 3.5 | 3.4 | 4.2 | 4.1 |
| Wet | 1.3 | 1.5 | 1.2 | 1.1 | 1.4 | 1.3 |
| Dry and wet repeated | 2.0 | 2.3 | 1.9 | 1.8 | 2.3 | 2.1 |

The invention claimed is:

1. A curing agent for epoxy resins, comprising
(a1) an aromatic amine,
(a2) an aliphatic amine having an aromatic ring or a cycloalkane ring,
(a3) a curing accelerator, and
a xylene resin;
wherein the amount of the xylene resin is 5 to 15 parts by mass based on the total amount of the curing agent being 100 parts by mass;

wherein the curing accelerator (a3) is a phenol or a modification product thereof, an aromatic carboxylic acid, or an imidazole, and wherein the amount of the aromatic amine (a1) is 50 to 60 parts by mass, the amount of the specific aliphatic amine (a2) is 20 to 30 parts by mass, and the amount of the phenol or the modification product thereof is 5 to 15 parts by mass, based on the total amount of the curing agent being 100 parts by mass.

2. The curing agent for epoxy resins according to claim 1, wherein the aromatic amine (a1) is diaminodiphenylmethane, diethyltoluenediamine, or a modification product thereof.

3. The curing agent for epoxy resins according to claim 1, wherein the aliphatic amine (a2) having an aromatic ring or a cycloalkane ring is benzylethylenediamine, benzylamine, or metaxylenediamine.

4. The curing agent for epoxy resins according to claim 1, wherein the ratio of the aromatic amine (a1) and aliphatic amine (a2) used, in terms of a mass ratio represented by (a1)/(a2), is in the range of from 10/90 to 90/10.

5. The curing agent for epoxy resins according to claim 1, wherein the ratio of the aromatic amine (a1) and aliphatic amine (a2) used, in terms of a mass ratio represented by (a1)/(a2), is in the range of from 50/50 to 80/20.

6. An epoxy resin composition, comprising (A) a curing agent for epoxy resins, and (B) a liquid epoxy resin, Wherein the curing agent for epoxy resins comprising
(a1) an aromatic amine,
(a2) an aliphatic amine having an aromatic ring or a cycloalkane ring,
(a3) a curing accelerator, and
a xylene resin;

wherein the amount of the xylene resin is 5 to 15 parts by mass based on the total amount of the curing agent being 100 parts by mass;

wherein the liquid epoxy resin (B) contains (b1) a bisphenol epoxy resin, and at least one of (b2) a polyhydric alcohol glycidyl ether and (b3) an aliphatic carboxylic acid glycidyl ester; and wherein the mass ratio of the bisphenol epoxy resin (b1)/(polyhydric alcohol glycidyl ether (b2)+ polybasic acid glycidyl ester (b3)) is in the range of from 70/30 to 90/10.

7. The epoxy resin composition according to claim 6, wherein the polyhydric alcohol glycidyl ether (b2) is 1,6-hexanediol diglycidyl ether.

8. The epoxy resin composition according to claim 6, further comprising (c) a reactive functional group-containing silane coupling agent.

9. The epoxy resin composition according to claim 6, which is a primer for concrete, a jointing material for concrete, or a repair material for concrete.

10. The epoxy resin composition according to claim 6, wherein the aromatic amine (a1) is diaminodiphenylmethane, diethyltoluenediamine, or a modification product thereof.

11. The epoxy resin composition according to claim 6, wherein the curing accelerator (a3) is a phenol or a modification product thereof, an aromatic carboxylic acid, or an imidazole.

12. The epoxy resin composition according to claim 6, wherein the aliphatic amine (a2) having an aromatic ring or a cycloalkane ring is benzylethylenediamine, benzylamine, or metaxylenediamine.

13. The epoxy resin composition according to claim 6, wherein the ratio of the aromatic amine (a1) and aliphatic amine (a2) used, in terms of a mass ratio represented by (a1)/(a2), is in the range of from 10/90 to 90/10.

* * * * *